Figure 1:
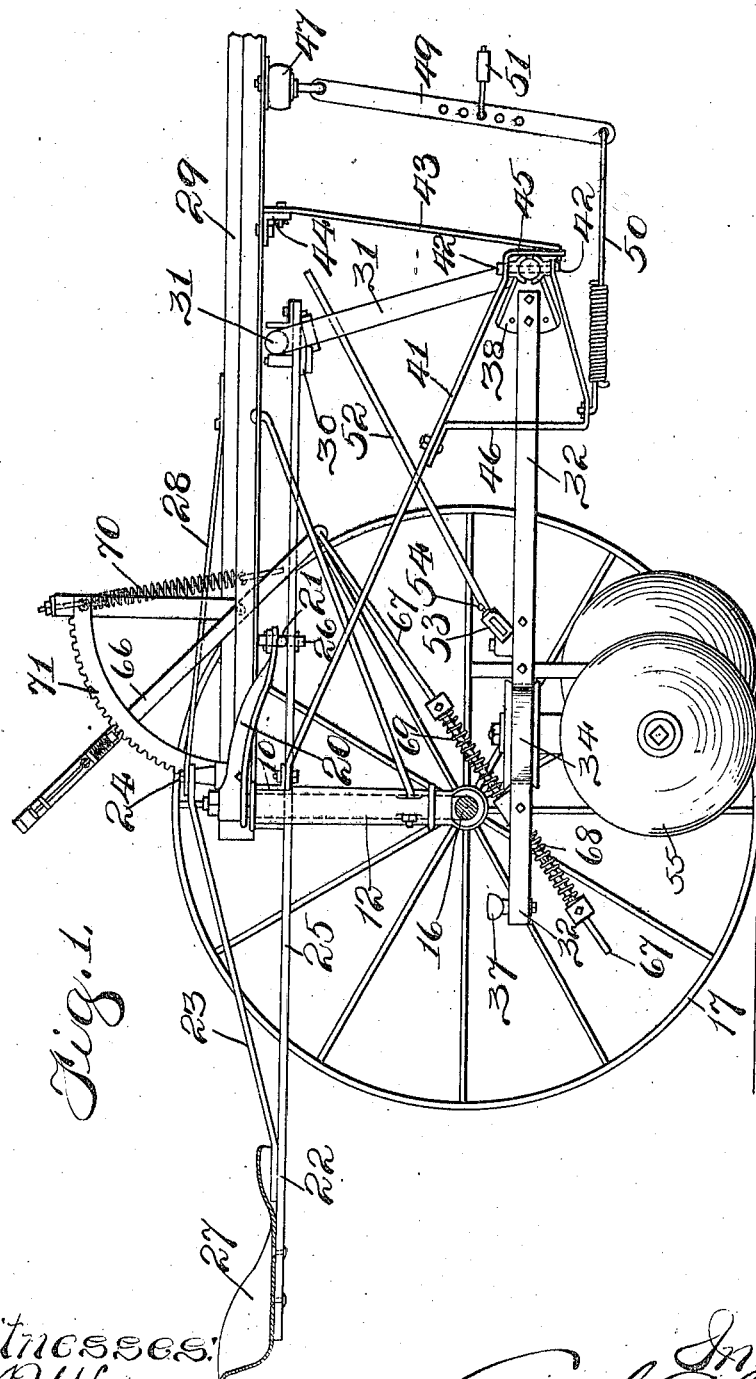

C. CHRISTENSEN.
AGRICULTURAL IMPLEMENT.
APPLICATION FILED AUG. 30, 1906.

996,313.

Patented June 27, 1911.
4 SHEETS—SHEET 1.

Witnesses:
J B Weir
G V Downarus.

Inventor:
Carl Christensen
by Bond, Adams, Pickard Jackson
Attys

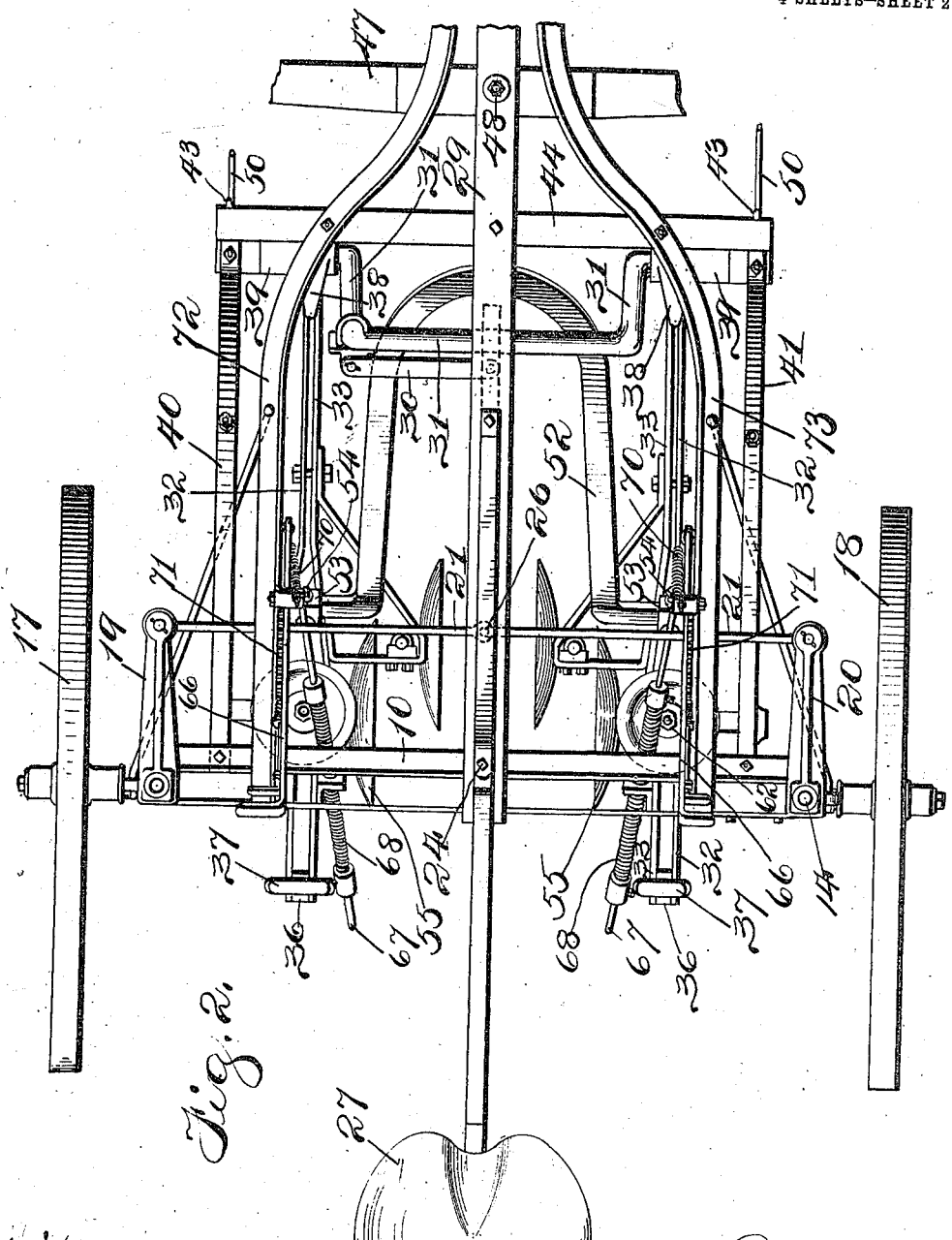

C. CHRISTENSEN.
AGRICULTURAL IMPLEMENT.
APPLICATION FILED AUG. 30, 1906.
996,313.
Patented June 27, 1911.
4 SHEETS—SHEET 3.
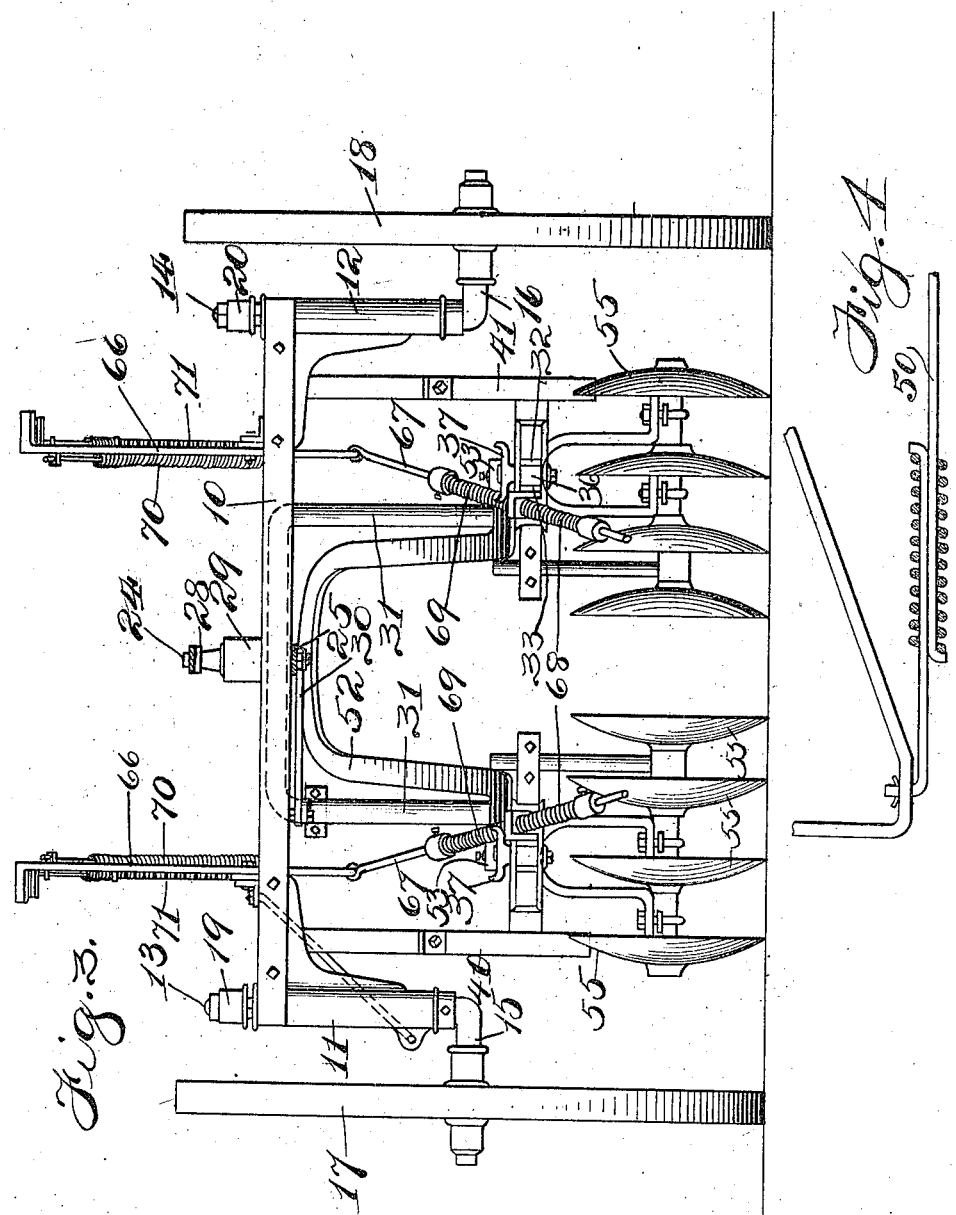
Witnesses:
JB Weir
G. V. Domarus.
Inventor:
Carl Christensen
by Bond, Adams, Pickard & Jackson
Attys

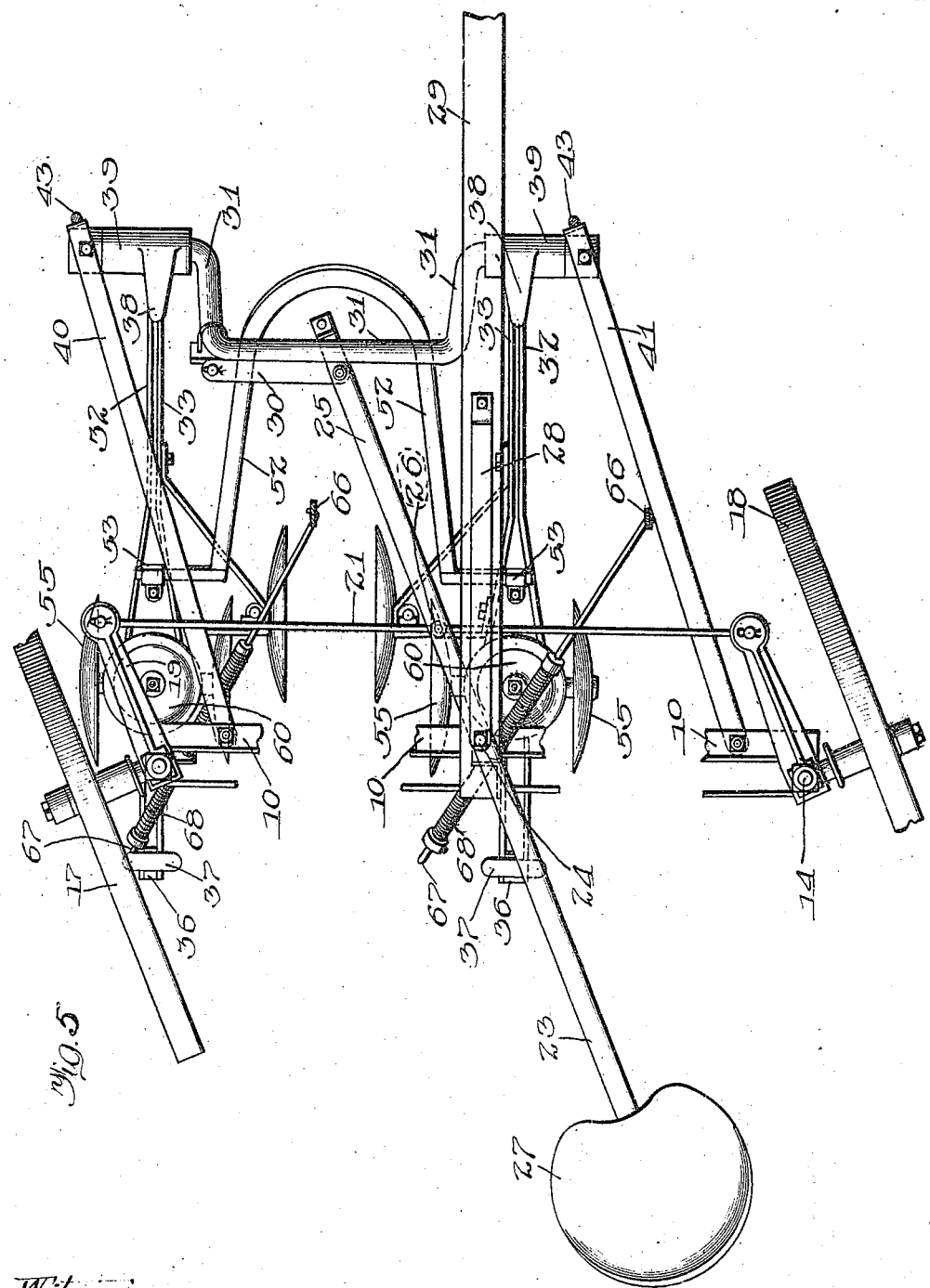

UNITED STATES PATENT OFFICE.

CARL CHRISTENSEN, OF CLIFTON, ILLINOIS, ASSIGNOR, BY MESNE ASSIGNMENTS, TO SEARS, ROEBUCK & COMPANY, OF CHICAGO, ILLINOIS, A CORPORATION OF NEW YORK.

AGRICULTURAL IMPLEMENT.

996,313.  Specification of Letters Patent.   Patented June 27, 1911.

Application filed August 30, 1906.   Serial No. 332,719.

*To all whom it may concern:*

Be it known that I, CARL CHRISTENSEN, a citizen of the United States, residing at Clifton, in the county of Iroquois, State of Illinois, have invented certain new and useful Improvements in Agricultural Implements, of which the following is a specification, reference being had to the accompanying drawings.

My invention relates to agricultural implements and has to do particularly with cultivators, although many of the improvements hereinafter described may be applied to other implements than cultivators proper, and the claims are therefore to be construed accordingly.

The object of my invention is to provide a new and improved construction by which the furrow-openers may be readily adjusted laterally; also to provide improved draft connections in connection with the cultivator beams so that the draft may be applied to the best advantage and may not interfere with the lateral adjustment of the gangs. I accomplish these objects as illustrated in the drawings and as hereinafter described.

That which I believe to be new will be set forth in the claims.

In the drawings,—Figure 1 is a side elevation of my improved cultivator; Fig. 2 is a plan view; Fig. 3 is a rear view thereof; Fig. 4 is an enlarged detail, showing the draft connections; and Fig. 5 is a plan view similar to Fig. 2 showing the parts in laterally-shifted position.

Referring to the drawings,—10 indicates the axle of the machine, which at its ends carries vertical bearings 11—12 which, as best shown in Fig. 3, receive the vertically-disposed spindles 13—14 of the wheel axles 15—16.

17—18 indicate the carrying wheels.

19—20 (Fig. 2) indicate crank arms mounted upon the upper ends of the spindles of the wheel axles and extending forward. Said arms are nonrotatably secured upon the upper ends of said spindles, being held in place by nuts, or other suitable means, so that the angular position of the carrying wheels may be adjusted by swinging said crank arms to one side or the other.

21 (Fig. 2) indicates a rod, which connects together the forward ends of the crank arms 19—20. Said rod acts to keep the carrying wheels in parallelism and also to connect them with the laterally movable seat-support hereinafter described.

22 indicates the seat support comprising two straps, the upper one 23 being pivotally mounted at its forward end upon the upper side of the main axle, as shown at 24 in Figs. 1 and 2, and extending backward and downward from said pivot, as shown in Fig. 1, to the point where it joins the lower member 25 of the seat support. The latter extends substantially horizontally forward under the axle of the machine, being connected by a pivot 26 with the transverse connecting rod 21, as shown in Fig. 1.

27 indicates the seat, which is mounted on the rear portion of the seat support. By this construction the seat may be swung to one side or the other, turning about the pivot 24 as an axis, and since the pivot 26 lies forward of said pivot 24, as clearly shown in Figs. 1 and 2, it follows that when the seat is moved in either direction the rear portions of the carrying wheels are moved in the same direction. The driver's position, therefore, between the wheels remains substantially unaltered.

28 indicates a brace connected with the pivot 24 and with the tongue 29.

As best shown in Fig. 1, the lower member 25 of the seat support extends forward to a point in advance of the front portions of the wheels and is connected by a strap 30, shown in Fig. 2, with an arch 31 with which the cultivator gangs are connected, as hereinafter described. The strap 30 is pivotally connected with the seat support and also with the arch so as not to interfere with the lateral movement of the seat support. Obviously when the seat support is swung about the pivot 24 the arch 31 is moved to one side or the other.

As best shown in Fig. 2, in the implement illustrated there are two gangs of furrow-openers, the furrow-openers of each gang being connected with a beam having the usual functions. As best shown in Fig. 2 each of the furrow-opener beams is composed mainly of two members or bars 32—33. Said bars at their forward ends are substantially parallel and lie in close proximity to each other. Their rear end portions are somewhat more widely separated and are provided intermediately with curved portions 34—35 which perform a special function in connection with the adjustment of the furrow-openers, as will be hereinafter described. At the rear of the curved portions 34—35 the beams are again substantially parallel and have secured between them blocks 36 carrying footrests 37, as shown in Figs. 1 and 2. At the front ends of the beams the members embrace and are rigidly connected to rearwardly-extending vertical segments 38 carried by sleeves 39 pivotally mounted on the ends of the front arch 31, as shown in Figs. 1 and 2. The segments 38 are rigid and consequently the beams are laterally rigid, having no pivotal motion laterally with relation to the front arch. They may, of course, swing in a vertical plane about the ends of said arch so as to adjust the vertical position of the furrow-openers.

The ends of the arch 31 are supported and guided by thrustbars 40—41 provided at the opposite sides of the machine, said thrustbars being pivotally connected at their rear ends with the main axle 10 and extending forward and downward therefrom over the ends of the arch, with which they are connected by pivots 42, as shown in Fig. 1. As therein shown, the front ends of the thrustbars 40—41 are bent downward over the ends of the arch 31 and are connected by laterally-swinging links 43 with a transverse bar 44 secured to the tongue at a point in advance of the arch 31, as also shown in Fig. 2.

46 indicates bars, which at their upper ends are connected with the thrustbars 41 intermediately and extend down from the point of their connection therewith and thence forward and upward to a point below the ends of the arch 31 where they are connected with the pivots 42 and with the depending front ends 45 of the thrustbars. Said bars 46 have draft connections by which the draft devices are connected with the front arch.

47 indicates a transverse bar or doubletree pivotally connected with the tongue at 48 and having depending draft bars 49 which are connected by spring connections 50 with the bars 46 at points back of the pivots 42; or, in other words, back of the front ends of the cultivator beams.

51 indicates whiffletrees which are carried by the draft bars 49. By this construction the draft of the team is not applied directly to the beam but a laterally swinging connection is interposed which has the effect of a thrustbar in transmitting the draft to the front end of the beam. It will be evident, therefore, that power employed in laterally adjusting the beam does not act directly against the pull of the team, as is the case where the draft is applied directly to the beams.

52 indicates an inclined arch, which extends backward and downward from the arch 31 and is connected at its rear ends with the rear portions of the cultivator beams, serving to hold them properly apart. As shown in Figs. 1 and 2, the front end of the arch 52 extends under the center of the arch 31, so that vertical adjustment of the furrow openers is not interfered with. The gangs may be set any desired distance apart as the arch 52 is adjustably connected to each of the beams, as indicated by the sleeves 53 and set-screws 54 shown in Figs. 1 and 2.

The construction and arrangement of the furrow-opener disks and the supporting devices therefor are not herein claimed, as they form the subject-matter of a separate application. It will suffice for the present application to state that the furrow-openers are so mounted as to be angularly adjustable to the line of draft and also so that their angular relation to the land may be varied.

66 indicates lifting levers for raising and lowering the furrow-openers. Said levers are pivoted upon the frame of the machine and are connected by connecting rods 67 and springs 68—69 with the rear end portions of the beams.

70 indicates lifting springs for assisting in lifting the gangs.

71 indicates the usual segmental racks for locking the levers 66 in different positions of adjustment.

72—73 indicate the side bars of the machine frame.

By the construction described the operator may turn the wheels simultaneously to run the machine to one side or the other, and at the same time appropriately shift the cultivator gangs. In changing the direction of travel of the wheels and the position of the gangs, the seat is shifted laterally in the same direction as the rear portions of the wheels, so that its position between the wheels is not substantially varied. The shifting of the wheels and gangs is accomplished by pressing the gangs laterally by power applied through the footrests 37, and as the seat moves in the opposite direction from the gangs, as the bars move the operator is enabled to apply power to a greater advantage. The front arch is moved laterally with the gangs which maintain their angular relation to the couplings so that the gangs are moved bodily laterally. The inclined arch 52 serves to hold the gangs properly apart and provides for their adjustment from time to time as may be necessary.

While I have described with considerable particularity the specific embodiment of my invention illustrated in the drawings, I wish it to be understood that I do not restrict myself to such details of construction except in so far as they are particularly claimed, as my invention includes generically the subject-matter of the broader claims.

That which I claim as my invention and desire to secure by Letters Patent is,—

1. In an agricultural implement, the combination of a wheeled frame, a beam, a furrow-opener connected with the beam, a laterally-movable bar connecting the forward portion of the beam with the frame, draft devices, and means for applying the draft to said bar between its ends and back of the point at which it is connected with the beam.

2. In an agricultural implement, the combination of a wheeled frame, a beam, a furrow-opener connected with the beam, a laterally-movable thrust-bar pivotally connected at its rear end with the frame and at its forward end with the beam, draft devices, and means for applying the draft to said bar between its ends and back of the point at which it is connected with the beam.

3. In an agricultural implement, the combination of a wheeled frame, beams, furrow-openers connected with the beams, an arch connected with the front end-portions of the beams, draft devices, laterally-movable bars pivotally connected at their rear ends with the frame and at their forward ends with the lower end-portions of the arch, and means for applying the draft to said bars between their ends and back of the point of connection thereof with the arch.

4. In an agricultural implement, the combination of a wheeled frame, a beam, a furrow-opener connected with the beam, a laterally-movable thrustbar pivotally connected with the frame and extending forward and pivotally connected with the front portion of the beam, a draft device, and means for applying the draft to said thrust-bar between its ends and at a point back of the point of its connection with the beam.

5. An agricultural implement, comprising a wheeled frame, a laterally-movable front arch, beams connected at their front ends with said arch, furrow-openers connected with said beams, draft devices, laterally-movable bars pivotally connected with the frame and extending forward and downward to and pivotally connected with said arch, and means for applying the draft to said bars between their ends and back of their connection with the arch.

6. An agricultural implement, comprising a wheeled frame, a laterally-movable front arch, beams connected with said arch at their front ends, furrow-openers connected with said beams, draft devices, laterally-movable thrust-bars pivotally connected with the frame and with the end portions of said front arch, and means for applying the draft to said thrust-bars between their ends and back of the connection thereof with said arch.

7. In an agricultural implement, the combination of a frame, wheels pivoted to swing about vertical axes, means for holding said wheels in parallelism, a front arch, laterally-movable bars connecting said frame with said front arch, means for turning said wheels to one side or the other and simultaneously moving said arch laterally, draft devices, beams connected at their forward ends with said arch and means for applying the draft to said bars between their ends and back of the point at which they are connected with the front arch.

8. In an agricultural implement, the combination of a frame, wheels pivoted to swing about vertical axes means for holding said wheels in parallelism, a front arch, laterally movable thrust-bars connecting said frame with said front arch, means for turning said wheels to one side or the other and simultaneously moving said arch laterally, draft devices, beams connected at their forward ends with said arch and means for applying the draft to said thrust-bars between their ends and back of the point at which they are connected with the front arch.

9. In an agricultural implement, the combination of a frame, wheels pivoted to swing about vertical axes, means for holding said wheels in parallelism, a front arch, laterally-movable bars connecting said frame with said front arch, a laterally-movable seat-support pivotally mounted on the frame, means connecting said seat-support with said wheels and with the arch whereby when said seat-support is swung laterally the wheels and arch are also swung laterally, draft devices, beams connected at their forward ends with said arch and means for applying the draft to said bars between their ends and back of the point at which they are connected with the front arch.

10. In an agricultural implement, the combination of a frame, wheels pivoted to swing about vertical axes, means for holding said wheels in parallelism, a front arch, laterally-movable bars connecting said frame with said front arch, means for turning said wheels to one side or the other and simultaneously moving said arch laterally, draft devices, beams connected at their forward ends with said arch, means for applying the draft to said bars between their ends and back of the point at which they are connected with the front arch, and an inclined arch connected with said beams and extending forward and upward therefrom.

11. In an agricultural implement, the combination of a wheeled frame, a laterally-swinging seat-support pivotally mounted thereon, said seat-support being extended forward of the pivot thereof, a front arch connected with the forward portion of the seat-support, beams connected with the end portions of said arch, furrow-openers connected with said beams, thrust-bars connected with said frame and with the end portions of said front arch, and draft devices connected with said thrust bars between their ends and back of the point at which they are connected to the front arch.

12. In an agricultural implement, the combination of a frame, wheels pivotally connected with said frame and arranged to be turned laterally in one direction or the other, a laterally-swinging seat-support pivotally mounted on said frame, said seat-support being extended forward of the pivot thereof, an arch connected with the forward portion of said seat-support, beams having a laterally-rigid connection with said arch, furrow-openers connected with said beams, and laterally-movable thrust-bars pivotally connected with the frame and extending forward and downward therefrom, said thrust-bars being pivotally connected with said arch and means for applying the draft to said thrust-bars between their ends and back of the point at which they are connected with the arch.

13. In an agricultural implement, the combination of a frame, wheels pivotally connected therewith and arranged to swing to one side or the other in unison, an arch, beams having a laterally-rigid connection with said arch, furrow-openers connected with said beams, laterally-movable thrust-bars pivotally connected with the frame and with said arch, means for applying the draft to said thrust-bars between their ends and back of the point at which they are connected with said arch, and means connected with said arch and with the wheels and adapted to be moved laterally to swing said wheels and arch laterally in one direction or the other.

14. In an agricultural implement, the combination of a wheeled frame, a beam, a furrow-opener connected with the beam, a laterally-movable bar connecting the forward portion of the beam with the frame, draft devices, and forwardly-extending means connected with said bar between its ends and back of the point at which it is connected with the beam and connected with the draft devices.

15. In an agricultural implement, the combination of a wheeled frame, a beam, a furrow-opener connected with the beam, a laterally-movable thrust-bar pivotally connected at its rear end with the frame and at its forward end with the beam, draft devices and means connected with the draft devices and connected with the forward portion of said bar back of the point at which it is connected with the beam for applying the draft to said bar.

16. In an agricultural implement, the combination of a wheeled frame, beams, furrow-openers connected with the beams, an arch connected with the front end-portions of the beams, draft devices, laterally-movable bars pivotally connected at their rear ends with the frame and at their forward ends with the lower end-portions of the arch, and means connected with the draft devices and with said bars near the forward ends thereof and back of the point of connection thereof with the arch for applying the draft to said bars.

17. In an agricultural implement, the combination of a wheeled frame, a beam, a furrow-opener connected with the beam, a laterally-movable thrust-bar pivotally connected at its rear end with the frame and at its forward end with the beam, draft devices and means connected with said draft devices and with said bar between its ends and back of the point at which it is connected with the beam for applying the draft to said bar.

18. In an agricultural implement, the combination of a wheeled frame, beams, furrow-openers connected with the beams, an arch connected with the front end-portions of the beams, draft devices, laterally-movable bars pivotally connected at their rear ends with the frame and at their forward ends with the lower end-portions of the arch, and means connected with said draft devices and with said bars between their ends and back of the point of connection thereof with the arch for applying the draft to said bar.

19. In an agricultural implement, the combination of a wheeled frame, a beam, a furrow-opener connected with the beam, a laterally-movable thrust-bar pivotally connected with the frame and extending forward and pivotally connected with the front portion of the beam, a draft device, and laterally swinging means connecting the draft device with said thrust-bar between its ends and at a point back of the point of its connection with the beam.

20. An agricultural implement, comprising a wheeled frame, a laterally-movable front arch, beams connected at their front ends with said arch, furrow openers connected with said beams, draft devices, laterally-movable bars pivotally connected with the frame and extending forward and downward to and pivotally connected with said arch, and laterally swinging means connected with said draft devices and with said bars between their ends and back of their connection with the arch.

21. An agricultural implement, comprising a wheeled frame, a laterally-movable front arch, beams connected with said arch at their front ends, furrow-openers connected with said beams, draft devices, laterally-movable thrust-bars pivotally connected with the frame and with the end portions of said front arch, and laterally swinging means connecting said draft devices with the thrust-bars between their ends and at a point back of the connection thereof with said arch.

CARL CHRISTENSEN.

Witnesses:
  HENRIK NANSEN,
  CHAS. WALSH.